(12) United States Patent
Barker

(10) Patent No.: US 10,513,082 B2
(45) Date of Patent: Dec. 24, 2019

(54) MONOLITHICALLY POURED CONCRETE CNG TANK WITH INTERNAL SUPPORT COLUMNS

(71) Applicant: R. Keith Barker, Walhalla, SC (US)

(72) Inventor: R. Keith Barker, Walhalla, SC (US)

(73) Assignee: HOLYSTONE USA, INC., Reisterstown, MD (US)

( * ) Notice: Subject to any disclaimer, the term of this patent is extended or adjusted under 35 U.S.C. 154(b) by 477 days.

(21) Appl. No.: 15/193,582

(22) Filed: Jun. 27, 2016

(65) Prior Publication Data

US 2016/0347007 A1 Dec. 1, 2016

Related U.S. Application Data

(63) Continuation-in-part of application No. 14/523,426, filed on Oct. 24, 2014, now abandoned.

(Continued)

(51) Int. Cl.
*A61G 17/00* (2006.01)
*B29C 67/24* (2006.01)
(Continued)

(52) U.S. Cl.
CPC ........ *B29C 67/243* (2013.01); *B28B 19/0038* (2013.01); *B28B 19/0046* (2013.01); *B29C 39/10* (2013.01); *B29C 39/26* (2013.01); *B29K 2103/08* (2013.01); *B29K 2995/0067* (2013.01); *B29K 2995/0069* (2013.01); *B29L 2031/7126* (2013.01); *F17C 2203/012* (2013.01); *F17C 2203/013* (2013.01); *F17C 2203/0304* (2013.01); *F17C 2203/0604* (2013.01); *F17C 2203/066* (2013.01);
(Continued)

(58) Field of Classification Search
CPC ...... F17C 1/08; F17C 1/16; F17C 2201/0128; F17C 2203/012; F17C 2203/0304; F17C 2203/0604; F17C 2203/0636; F17C 2203/066; F17C 2203/0678; B29C 67/243; B29C 39/10; B29C 39/26; B28B 19/0038; B28B 19/0046
USPC .............................. 220/586, 567.1, 592, 901
See application file for complete search history.

(56) References Cited

U.S. PATENT DOCUMENTS 3,566,824 A * 3/1971 Cuneo ..................... B63B 25/16
114/74 A
4,934,122 A 6/1990 Linquist
(Continued)

*Primary Examiner* — Andrew T Kirsch
*Assistant Examiner* — Elizabeth J Volz
(74) *Attorney, Agent, or Firm* — Thomas C. Saitta

(57) ABSTRACT

A method of forming a polymer concrete CNG tank by forming an inflatable liner member composed of high density polymer impermeable to CNG; providing column forms as part of the liner member, the column forms having open tops and open bottoms and extending completely through the liner member; providing an outer form; positioning the liner member within the outer form with the column forms vertically oriented, the liner member being positioned to provide a gap between the liner member and the outer form; inflating the liner member; pouring polymer concrete about the liner member and through the column forms; and allowing the polymer concrete to cure. Reinforcement members may be positioned around the liner member and within the column forms prior to the step of pouring the polymer concrete.

16 Claims, 3 Drawing Sheets

Related U.S. Application Data

(60) Provisional application No. 61/961,892, filed on Oct. 25, 2013, provisional application No. 62/185,253, filed on Jun. 26, 2015.

(51) Int. Cl.
  *B29C 39/10* (2006.01)
  *B29C 39/26* (2006.01)
  *B28B 19/00* (2006.01)
  B29K 103/08 (2006.01)
  B29L 31/00 (2006.01)

(52) U.S. Cl.
  CPC ............ *F17C 2203/0636* (2013.01); *F17C 2203/0673* (2013.01); *F17C 2203/0678* (2013.01); *F17C 2205/0332* (2013.01); *F17C 2209/21* (2013.01); *F17C 2209/22* (2013.01); *F17C 2221/033* (2013.01); *F17C 2223/0123* (2013.01); *F17C 2223/036* (2013.01); *F17C 2270/0147* (2013.01)

(56) References Cited

U.S. PATENT DOCUMENTS

| | | | |
|---|---|---|---|
| 5,134,758 A * | 8/1992 | Christensen | B28B 19/0046 27/35 |
| 5,800,752 A | 9/1998 | Charlebois | |

* cited by examiner

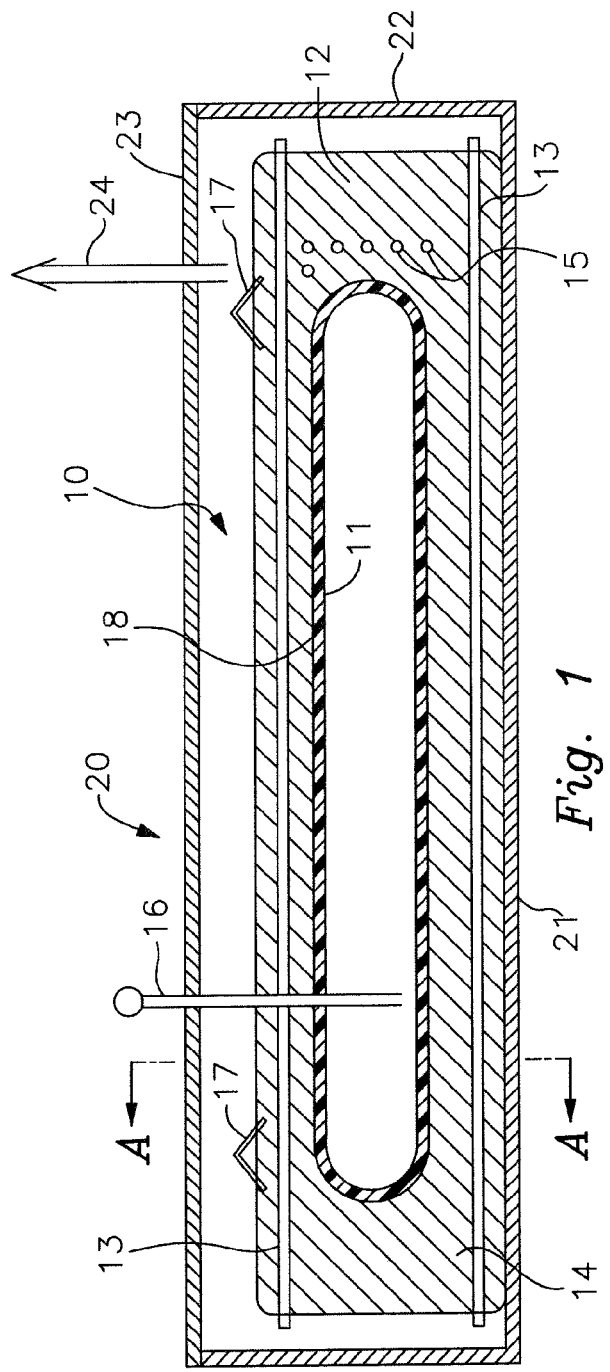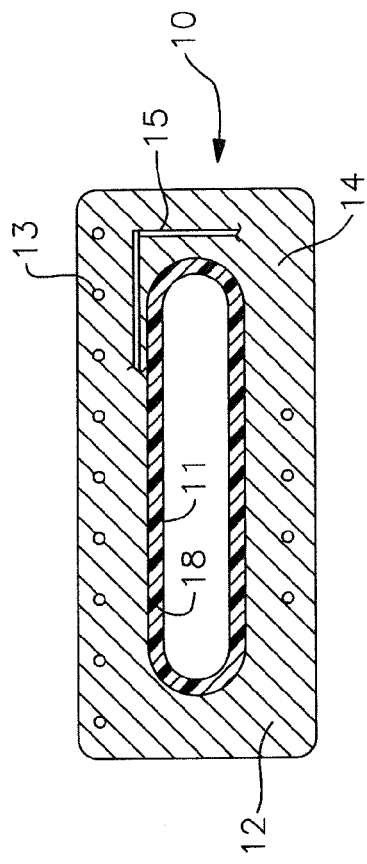

MONOLITHICALLY POURED CONCRETE CNG TANK WITH INTERNAL SUPPORT COLUMNS

This application is a continuation-in-part of U.S. patent application Ser. No. 14/523,426, filed Oct. 24, 2014, which claims the benefit of U.S. Provisional Patent Application Ser. No. 61/961,892, filed Oct. 25, 2013, the disclosure of which is incorporated herein by reference. This application further claims the benefit of U.S. Provisional Patent Application Ser. No. 62/185,253, filed Jun. 26, 2015, the disclosure of which is incorporated herein by reference.

BACKGROUND OF THE INVENTION

The invention relates in general to storage tanks and their methods of construction, and more particularly relates to storage tanks formed of concrete and used to store and dispense compressed natural gas (CNG) in pure or blended form. Even more particularly, the invention relates to concrete storage tanks having internal support columns and an internal liner member, wherein the tanks are monolithically poured with the internal liner member being the internal mold or form during the concrete pouring process.

Concrete tanks for storage of non-pressurized natural gas are known, being either concrete tanks for storing liquid natural gas or concrete structures that house typical non-concrete CNG tanks. The known concrete tanks suffer from permeability and shearing problems. Furthermore, higher pressures require thicker walls or multiple tank or vault layers.

It is an object of this invention to provide an improved concrete CNG tank capable of storing natural gas under pressure that addresses these problems, and in particular to provide a method of creating a concrete tank capable of storing CNG at high pressures using a single or monolithic pour, wherein the strength of the tank is increased by providing poured-in-place internal support columns such that the width of the concrete walls may be reduced and the volume of the tank may be increased from that normally required to withstand the high pressure.

SUMMARY OF THE INVENTION

The invention in various embodiments is a methodology for producing an improved concrete tank suitable for storage of CNG, and the concrete tank produced by the methodology. The tank is preferably formed of a polymer concrete material and is provided with a gas impermeable liner member.

The internal liner member is fabricated with a closed volume, typically in an elliptical or spherical configuration. Negative-space, column-forming cavities are provided in the liner member that extend completely through the interior volume of the liner member, the cavities being defined by column forms or molds, the column forms being open at each end such that wet concrete will pass through and then be retained within the cavities during the pouring process. An outer mold or form is constructed to define the outer surface of the concrete tank. The internal liner member is positioned inside the outer form and inflated to a pressure sufficient to withstand the weight and flow of the wet concrete without collapsing. The liner member is oriented such that the cavities are vertically oriented and the liner member is supported or suspended so as to be separated from the outer form such that a gap is present on the bottom and on all sides of the liner member to receive the wet concrete. An access port is incorporated into the liner member, the access port providing the conduit for the fill port, dispenser port and pressure release systems. Anchor members are provided on the exterior of the liner member that extend into the concrete such that the liner member maintains its maximum volume after the concrete has hardened. The concrete is poured onto and around the liner member and through the cavities in a single or monolithic pour, such that upon curing the concrete forms a monolithic tank surrounding the liner member and having vertical concrete columns extending through the liner member. Reinforcing members, such as for example rebar, may be present in the bottom, side walls, top and/or vertical columns of the concrete tank.

In alternative language, the invention is a method of forming a polymer concrete CNG tank comprising the steps of forming an inflatable liner member composed of high density polymer impermeable to CNG; inflating said liner member. The method may further comprise pouring polymer concrete about said liner member and allowing said polymer concrete to cure, positioning reinforcement members about said liner member after said step of inflating said liner member, and positioning fill and discharge port members in communication with the interior of said liner member after said step of inflating said liner. The method may further comprise providing an outer form and positioning said liner member within said outer form prior to said step of inflating said liner. The method may further comprise providing column forms as part of said liner member, said column forms having open tops and open bottoms and extending completely through said liner member; whereby during said step of pouring concrete, concrete is poured into and through said column forms.

In further alternative language, the invention is a method of forming a polymer concrete CNG tank comprising the steps of forming an inflatable liner member composed of high density polymer impermeable to CNG; providing column forms composed of high density polymer as part of said liner member, said column forms having open tops and open bottoms and extending completely through said liner member; providing an outer form to receive and retain poured concrete; positioning said liner member within said outer form with said column forms vertically oriented, said liner member being positioned to provide a gap between said liner member and said outer form; inflating said liner member; pouring polymer concrete about said liner member, through said column forms and into said gap, whereby said liner member is completely encased in said polymer concrete; and allowing said polymer concrete to cure. The method may further comprise providing anchor members on the exterior of said liner member, whereby said anchor members are retained within said concrete upon curing to prevent movement of said line member, mounting an access port to said liner member prior to said step of pouring polymer concrete, said access port providing a conduit through said liner member and said concrete tank, and connecting a fill port system, a dispenser port system and pressure release system to said access port for communication with the interior of said liner member, removing said concrete tank from said outer form and burying said concrete tank in the ground, wherein said step of burying said concrete form is performed without placing said concrete tank into a vault, wherein said access port comprises a shaft having an upper flange and a lower flange, and wherein said step of mounting said access port comprises providing a gasket and a compression plate within said liner member and a pipe extending through said shaft connected to said compression plate, raising said compression plate and said gasket to abut said liner member, and securing said pipe to said access port; further comprising the step of positioning reinforcement members above said liner member and between said liner member and said outer form prior to performing said step of pouring polymer concrete, further comprising the step of positioning reinforcement members within said column forms prior to performing said step of pouring polymer concrete, and/or further comprising the step of joining said reinforcement members positioned within said column forms to said reinforcement members above and below said liner member.

The invention is also defined as a polymer concrete CNG tank comprising a liner member and internal support columns, formed by a method comprising the steps of forming an inflatable liner member composed of high density polymer impermeable to CNG; providing column forms composed of high density polymer as part of said liner member, said column forms having open tops and open bottoms and extending completely through said liner member; providing an outer form to receive and retain poured concrete; positioning said liner member within said outer form with said column forms vertically oriented, said liner member being positioned to provide a gap between said liner member and said outer form; inflating said liner member; pouring polymer concrete about said liner member, through said column forms and into said gap, whereby said liner member is completely encased in said polymer concrete; and allowing said polymer concrete to cure. The invention may further comprise reinforcement members positioned within said internal support columns, wherein said reinforcement members are positioned within said column forms prior to performing said step of pouring polymer concrete; and/or reinforcement members positioned above and below said liner member and joined to said reinforcement members positioned within said internal support columns, wherein said reinforcement members positioned above and below said liner member and joined to said reinforcement members positioned within said internal support columns are positioned and joined prior to said step of pouring polymer concrete.

BRIEF DESCRIPTION OF THE DRAWINGS

FIG. 1 longitudinal cross-sectional view of an embodiment of the invention.

FIG. 2 is a transverse cross-sectional view of the embodiment of FIG. 1, taken along line A-A.

DETAILED DESCRIPTION OF THE INVENTION

Figure 3:
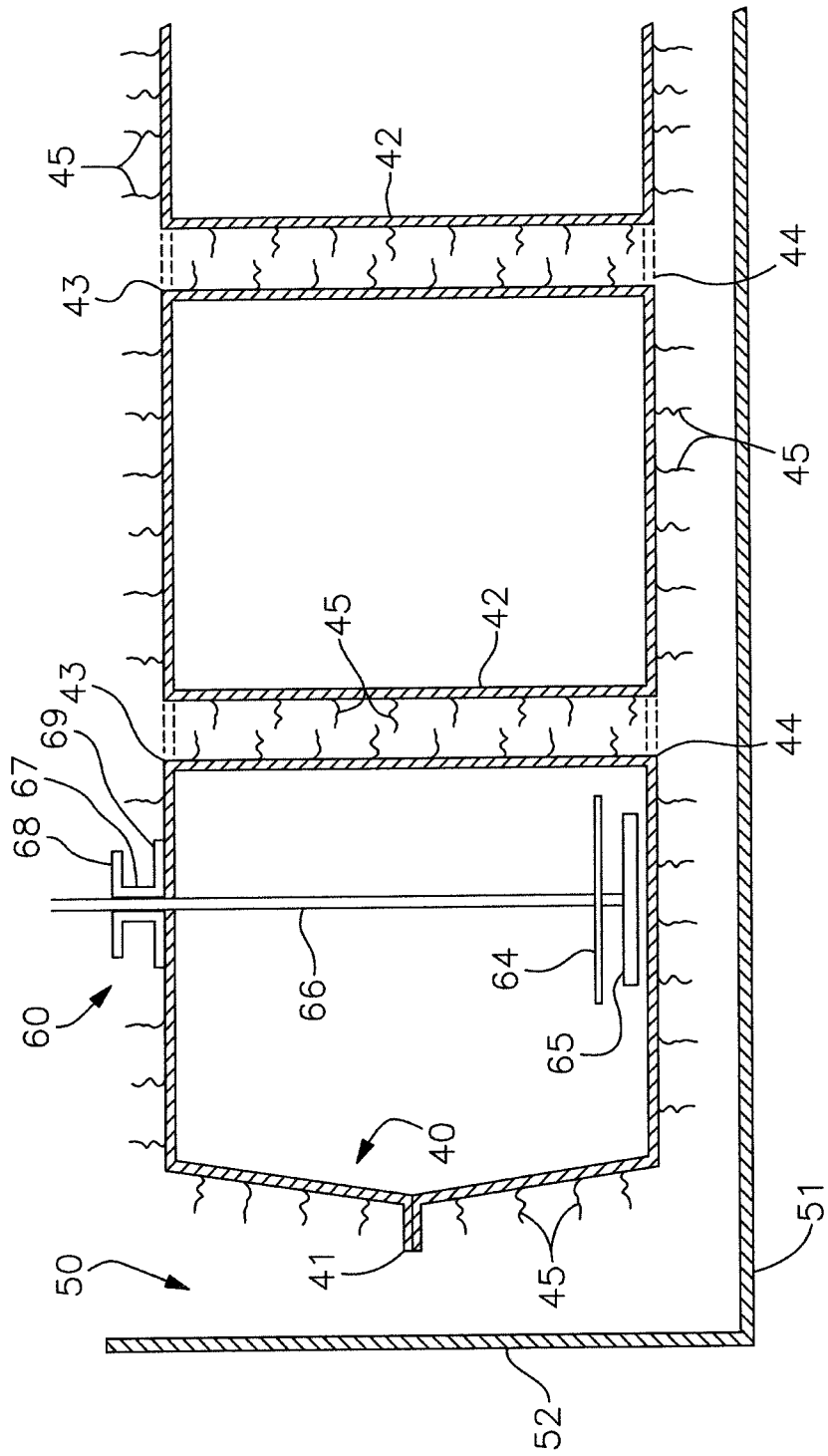
FIG. 3 is a partial cross-sectional view of the outer form and the inflated liner member showing the negative-space vertical column forms and the non-secured access port prior to the monolithic concrete pour.

With reference to the drawings, embodiments of the invention will now be described in detail, the descriptions and figures not intended to be limiting. In a broad sense, the invention in certain embodiments is a polymer blend concrete CNG tank 10 comprising a liner member 11, the tank 10 being preferably disposed within a concrete vault 20. In other embodiments, the invention is a CNG tank 30 comprising a liner member 40 and internal concrete columns 31 that is formed by a monolithic pour and is structured such that an exterior vault is not needed. In still other embodiments, the invention is a method of forming a CNG tank 30 comprising a liner member 40 and internal concrete columns 31 that is formed by a monolithic pour. In this disclosure, the term CNG, short for compressed natural gas, shall be taken to mean pure or blended forms of CNG.

Polymer concrete or polymer blend concrete utilizing a resin binder is a known construction material that is advantageous in circumstances requiring high strength and slightly reduced rigidity, such that the cured product has a small degree of flexibility and elasticity in order to resist shearing and cracking. In one possible embodiment, the tank 10 is formed as a polymer concrete body 12 surrounding a large internal void creating by pouring the polymer concrete around an elliptical tank or outer form 18. The tank form 18 may be composed of metal, plastic or similar materials. The tank form 18 is composed of a liquid and gas impermeable material, and must be of sufficient rigidity to remain undistorted during the polymer concrete pouring operation.

In a preferred embodiment, an internal polymer liner 11 is disposed within the polymer concrete body 12, the liner 11 being impermeable to gas and liquid under high pressure. A high density polymer liner sold under the brand AGRU LINER is suitable in this application. The liner 11 may be formed by folding the material and crimping the edges to form an envelope, which is then expanded to be used as the interior mold about which the polymer concrete is poured to form the polymer concrete body 12. Alternatively, the liner 11 may be disposed adjacent the tank form 18.

The polymer concrete body 10 is provided internally with various reinforcing members. Preferably, the tank 10 is provided with pre-stressed cable reinforcement members 13, rebar reinforcement members 15 arranged in a cage-like configuration, and/or fiber reinforcement members 14. Lifting eye members 17 are also provided on the exterior of the tank 10 to enable lifting and transport of the tank 10.

Fill and discharge port members 16 consisting of piping, valves and the like that provide the necessary conduits to the interior of the tank 10 are properly positioned prior to pouring the polymer concrete to preclude the need to breach the polymer concrete body 12 after it has cured. The fill and discharge ports 16 provide access to the interior of the tank form 18 and the liner 11 when present.

A tank 10 constructed as described is capable of withstanding pressures greater than 5000 psi, thereby making the tank 10 suitable for the storage of large quantities of CNG. The tank 10 is relatively inexpensive to construct, can be formed in various shapes and sizes, is easily lifted and transported, and maintains the CNG at reduced temperature even in high temperature environments due to its highly insulative nature.

In one representative assembly shown in FIG. 1, the tank 10 is located within a preformed concrete vault 20 having a bottom 21, walls 22 and a removable cover 23, which may be formed in a modular assembly. The vault 20 is preferably partially or totally positioned below ground level, and acts as a secondary containment system in the event of there is leakage from the tank 10. Venting port members or conduits 24 may be provided in the vault 20 to allow escaped gas to vent to atmosphere. The presence of the vault 20 increases the insulative properties of the system.

Figure 4:
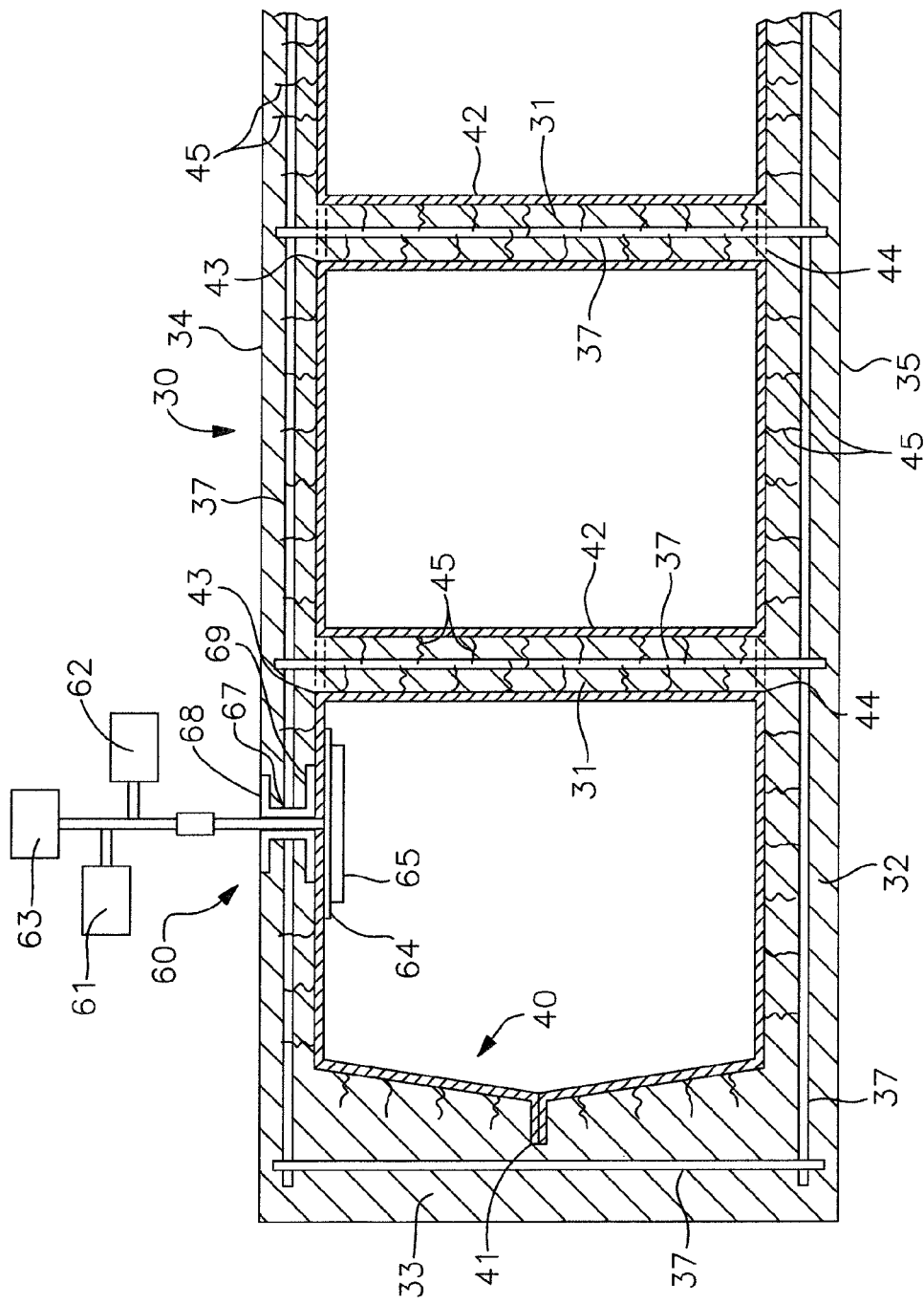
FIG. 4 is a partial cross-sectional view of the cured concrete tank, internal liner member, vertical support columns and sealed access port.

An alternative methodology embodiment and the tank produced by this alternative embodiment is illustrated in FIGS. 3 and 4. With this methodology, a high volume, high pressure, CNG tank 30 is produced with reduced wall thicknesses and no necessity for the tank 30 to be encased within an external vault, the structural integrity and impermeability of the tank 30 being such that it may be buried directly in the ground.

The internal liner member 30 is fabricated to create a closed-volume bladder, typically in an elliptical or spherical configuration formed by joining sheets of a suitable polymer material, such as for example high density polyethylene (HDPE). HDPE can withstand a 230 degrees F. working heat generated by CNG compression heat and is impermeable to the CNG. The HDPE is also impermeable to external groundwater penetration. The HDPE sheets are joined, bonded or welded in known manner to form sealed joints 41.

Negative-space, column-forming cavities are defined by column forms 42 also composed of a suitable polymer material, preferably HDPE, are incorporated in the overall structure of the internal liner member 40. The column forms 42 extend completely through the interior volume of the liner member 40, the column forms 42 being tubular and open externally to the liner member 40 at each end, the open ends defining an open top end 43 and an open bottom end 44, such that wet concrete will pass through and then be retained within the column forms 42 during the pouring process. The column forms 42 are joined, bonded or welded to be part of the liner member 40 in known manner such that the closed internal volume of the liner member 40 is maintained, enabling it to retain air when inflated. Typically, the column forms 42 will be arranged in a linear array centered on the longitudinal axis of the liner member 40, but other configurations are possible as is the provision of multiple rows or other arrangements of column forms 42 for larger tanks 30.

An outer mold or form 50 is constructed to define the outer surface 35 of the concrete tank 30. The outer mold 50 may be constructed in known manner to comprise a bottom 51 and side walls 52 of sufficient strength and rigidity to retain the weight and pressure of the wet concrete during the pour operation.

The internal liner member 40 is positioned inside the outer form 50 and inflated to a pressure sufficient to withstand the weight and flow of the wet concrete. The liner member 40 is oriented such that the column forms 42 are vertically oriented. The liner member 40 is supported or suspended within the outer form 50 in known manner so as to be separated from the bottom 51 and side walls 52 of the outer form 50 such that a gap to receive the wet concrete is present beneath and on all sides between the liner member 40 and the outer form 50. Anchor members 45, such as for example flaps or tabs of polymer material, are provided on the exterior of the liner member 40 that extend into the concrete such that the liner member 40 maintains its maximum volume after the concrete has hardened. The anchor members 45 also prevent shifting or movement of the liner member 40 relative to the concrete tank 30 after the tank 30 has cured, thereby increasing the life of the liner member 40.

An access port 60 is mounted to the liner member 40, the access port 60 providing the conduit for the fill port system 61, dispenser port system 62 and pressure release system 63 through both the concrete tank 30 and the liner member 40. The access port 60 is preferably structured as a cast-in steel port that is provided with an assembled mechanical compression seal. The compression seal may comprise a polymer gasket 64 of suitable material for use in CNG environments, such as for example a neoprene gasket, and a steel compression plate 65 joined to a vertical pipe 66. The access port 60 is also utilized to deliver inflation air into the liner member 40 through the vertical pipe 66. The access port 60 may be structured as a tubular shaft 67 having an upper radially-extending flange 68 and a lower radially-extending lower flange 69. The fill port system 61, dispenser port system 62 and pressure release system 63 may be connected to pipe 66.

To maximize the strength and rigidity of the concrete tank 30, reinforcement members 37 of known type, such as for example rebar, may be positioned between the outer form 50 and the liner member 30, above the liner member 40, and also within the cavities defined by the column forms 42, prior to pouring the concrete, as shown in FIG. 4. This reinforcement is especially desirable for large tanks. The reinforcement members 37 are preferably continuously joined or looped so as to better displace the pressure energy from the exterior walls 33 to the interior columns 31.

With the liner member 40 properly positioned and inflated, wet concrete is poured onto and around the liner member 40 and through the column forms 42 in a single or monolithic pour, such that upon curing the concrete forms a monolithic tank 30 surrounding the liner member 40, the concrete tank 30 having vertical concrete columns 31 extending through the liner member column forms 42 and connecting the concrete bottom 32 to the concrete top 34. The liner member 40 directly contacts and abuts the inner surface 36 of the concrete tank 30. A polymer concrete is preferred, and most preferred is a type of concrete known an ultra-high performance concrete (UHPC), which exhibits improved pour, strength, shrinkage and crack resistance properties over conventional concrete.

To seal the access port 60 after the concrete has cured, the gasket 64 and compression plate 65 are brought up by raising the pipe 66 so as to entrap a portion of the liner member 40 between the gasket 64 and the access port 60. The pipe 66 is then mechanically secured to the access port 60 using for example a tension ring and a lock bolt. The fill port systems 61, dispenser port systems 62 and pressure release systems 63 are then connected such that a fluid conduit is provided through pipe 66 into the interior of the liner member 40.

Significant cost savings of up to $100,000 per CNG dispensing station are achieved by eliminating the need for external vaults to surround the concrete CNG tanks 30. Because the tanks 30 are formed as a monolithic structure with a single pour and any number of concrete columns 31 may be designed into the tanks 30, relatively large tanks 30 with greater than typical volumes are easily created. The three-dimensional footprint of each tank 30 is minimalized, thereby allowing more tanks 30 to be placed into a smaller area. Large elliptical tanks 30 can be combined with smaller spherical tanks 30, for example. The presence of the concrete columns 31 results in a stronger tank 30 and increases the external load capacity, the internal storage capacity, and reduces the amount of concrete required. AS a safety precaution the tank 30 may be buried in a hole lined with crushed stone and leak sensors installed to detect any gas leakage into the environment. Monitoring devices to measure the internal CNG pressure, CNG volume, moisture content, etc., may also be provided through the access port 60.

It is understood that equivalents and substitutions for certain elements and steps set forth above may be obvious to those of skill in the art, and thus the true scope and definition of the invention is to be as set forth in the following claims.

I claim:

1. A method of forming a polymer concrete CNG tank comprising the steps of:

forming an inflatable liner member composed of high density polymer impermeable to CNG;

providing column forms composed of high density polymer as part of said liner member, said column forms having open tops and open bottoms and extending completely through said liner member;
providing an outer form to receive and retain poured concrete;
positioning said liner member within said outer form with said column forms vertically oriented, said liner member being positioned to provide a gap between said liner member and said outer form;
inflating said liner member;
pouring polymer concrete about said liner member, through said column forms and into said gap, whereby said liner member is completely encased in said polymer concrete; and
allowing said polymer concrete to cure.

2. The method of claim 1, further comprising the steps of:
providing anchor members on the exterior of said liner member, whereby said anchor members are retained within said concrete upon curing to prevent movement of said line member.

3. The method of claim 1, further comprising the steps of:
mounting an access port to said liner member prior to said step of pouring polymer concrete, said access port providing a conduit through said liner member and said concrete tank; and
connecting a fill port system, a dispenser port system and pressure release system to said access port for communication with the interior of said liner member.

4. The method of claim 3, wherein said access port comprises a shaft having an upper flange and a lower flange; and
wherein said step of mounting said access port comprises providing a gasket and a compression plate within said liner member and a pipe extending through said shaft connected to said compression plate, raising said compression plate and said gasket to abut said liner member, and securing said pipe to said access port.

5. The method of claim 3, further comprising the steps of:
removing said concrete tank from said outer form; and
burying said concrete tank in the ground.

6. The method of claim 5, wherein said step of burying said concrete form is performed without placing said concrete tank into a vault.

7. The method of claim 3, further comprising the steps of:
removing said concrete tank from said outer form;
providing a vault comprising a bottom, walls, a removable cover and a venting port member; and
placing said concrete tank within said vault;
whereby gases escaping from said concrete tank are vented to atmosphere through said venting port member.

8. The method of claim 7, further comprising the step of burying said vault in the ground.

9. The method of claim 1, further comprising the steps of:
removing said concrete tank from said outer form; and
burying said concrete tank in the ground.

10. The method of claim 9, wherein said step of burying said concrete form is performed without placing said concrete tank into a vault.

11. The method of claim 1, further comprising the step of positioning reinforcement members above said liner member and between said liner member and said outer form prior to performing said step of pouring polymer concrete.

12. The method of claim 11, further comprising the step of positioning reinforcement members within said column forms prior to performing said step of pouring polymer concrete.

13. The method of claim 12, further comprising the step of joining said reinforcement members positioned within said column forms to said reinforcement members above and below said liner member.

14. The method of claim 1, further comprising the steps of:
removing said concrete tank from said outer form;
providing a vault comprising a bottom, walls, a removable cover and a venting port member; and
placing said concrete tank within said vault;
whereby gases escaping from said concrete tank are vented to atmosphere through said venting port member.

15. The method of claim 14, further comprising the step of burying said vault in the ground.

16. A polymer concrete CNG tank comprising a liner member, internal support columns formed of concrete and extending completely through said liner member, reinforcement members positioned within said internal support columns, and additional reinforcement members positioned above and below said liner member and joined to said reinforcement members positioned within said internal support columns; wherein said polymer concrete CNG tank is formed by a process comprising the steps of:
forming an inflatable liner member composed of high density polymer impermeable to CNG;
providing column forms composed of high density polymer as part of said liner member, said column forms having open tops and open bottoms and extending completely through said liner member;
positioning reinforcement members within said column forms;
providing an outer form to receive and retain poured concrete;
positioning said liner member within said outer form with said column forms vertically oriented, said liner member being positioned to provide a gap between said liner member and said outer form;
positioning additional reinforcement members above and below said liner member and joining said additional reinforcing members to said reinforcement members positioned within said internal support columns;
inflating said liner member;
pouring polymer concrete about said liner member, through said column forms and into said gap, whereby said liner member is completely encased in said polymer concrete; and
allowing said polymer concrete to cure.

\* \* \* \* \*